United States Patent [19]

Miremadi et al.

[11] Patent Number: 5,328,618
[45] Date of Patent: Jul. 12, 1994

[54] MAGNETIC LUBRICANTS

[75] Inventors: Bijan K. Miremadi, Coquitlam; Stanley R. Morrison, Burnaby; Konrad Colbow, West Vancouver, all of Canada

[73] Assignee: 410261 B.C. Ltd., West Vancouver, Canada

[21] Appl. No.: 923,569

[22] Filed: Aug. 3, 1992

[51] Int. Cl.$^5$ .............................. C04B 35/00
[52] U.S. Cl. ........................... 252/30; 252/29; 252/62.51; 252/62.55
[58] Field of Search ............ 252/62.51 R, 29, 30

[56] References Cited

U.S. PATENT DOCUMENTS

| | | | |
|---|---|---|---|
| 3,377,280 | 4/1968 | Knappwost | 252/30 |
| 3,629,107 | 12/1971 | Groszek et al. | 252/29 |
| 3,914,178 | 10/1975 | Fineran et al. | 252/29 |
| 4,473,481 | 9/1984 | Fukutsuka et al. | 252/30 |
| 4,798,771 | 1/1989 | Vogel | 252/29 |
| 4,900,465 | 2/1990 | Nakada et al. | 252/62.51 |
| 4,995,999 | 2/1991 | Nakada et al. | 252/62.51 |

Primary Examiner—Ellen M. McAvoy
Attorney, Agent, or Firm—Norman M. Cameron

[57] ABSTRACT

A lubricant has the formula X:Y, wherein X is a layered material selected from the group consisting of layered transition metal dichalcogenides and graphite. Y is a magnetic inclusion between layers of X. The lubricant is made by adding X to a solution containing ions of Y. The solution is continuously mixed and dried. The Y is then reduced to a metallic form.

25 Claims, 7 Drawing Sheets

MAGNETIC LUBRICANTS

BACKGROUND OF THE INVENTION

1. Field of the Invention

This invention relates to modified and improved layered lubricants, such as molybdenum disulfide and graphite.

2. Description of Related Art

Layered substances such as molybdenum disulfide, tungsten disulfide and graphite have been used in the past, both as dry lubricants and as additives dispersed in liquid lubricants to reduce the friction and wear between moving surfaces. These materials initially improve the anti-wear properties and lower the friction when used as a solid lubricant. However, as the two surfaces continue to move against each other, the lubricating particles tend to spread away from the asperity contact points. This results in an increase in the friction.

An example is the case of a drill bit rotating against a metal surface while drilling a hole. Within seconds of drilling, the rotating action makes a solid lubricant move away from the tip of the drill and thus increases the friction between the surfaces in contact. It would be desirable to provide some means for maintaining solid lubricants in position between the moving surfaces where they help to reduce the friction instead of being dispersed away from this area.

SUMMARY OF THE INVENTION

It is therefore an object of the invention to provide an improved lubricant of any one of the layered materials which has properties tending to hold the lubricant layers in position between the surfaces in relative motion.

It is also an object of the invention to provide an improved solid lubricant which is more efficient compared to those provided by molybdenum disulfide or graphite alone for example.

It is a further object of the invention to provide an improved lubricant which maintains its properties for a long duration of time and is not adversely affected by conditions encountered by lubricants, such as oxidation.

In accordance with these objects, the invention provides a lubricant having the formula X:Y. X is a layered material selected from the group consisting of layered transition metal dichalcogenides and graphite. Y is a magnetic inclusion between layers of X.

Preferably, X is selected from the group consisting of $MoS_2$, $WS_2$ and graphite, and Y is selected from the group consisting of Fe, Ni and Co.

Another aspect of the invention provides a process for making a magnetic lubricant having the formula X:Y wherein X is a layered composition and Y is a magnetic metal inclusion between layers of X. The process comprises the steps of:

(a) adding X to a solution containing ions of Y;
 (b) mixing the solution and Y to form a mixture;
 (c) drying the mixture; and
 (d) reducing the Y to a metallic form.

The solution may be an aqueous solution of a salt of Y. For example, the salt may be a chloride selected from the group consisting of chlorides of Fe, Ni and Co.

The Y may be magnetized after being reduced to the metallic form by applying a magnetic field to the X:Y.

DESCRIPTION OF THE PREFERRED EMBODIMENTS

The preferred material for the layered, solid lubricant is $MoS_2$ rather than the other known layered materials, such as $WS_2$ or graphite. However, graphite may be used as may other transition metal dichalcogenides having the formula $AB_2$, wherein A is Mo, W, Ti or Ta and B is S or Se. The solid lubricant with magnetic properties is prepared by starting with as-received $MoS_2$ powder (or other powdered lubricants), which is impregnated with an aqueous solution of Fe, Ni or Co, preferably in the chloride form. The mixture is slowly but continuously mixed and dried at about 120° C. The resulting well-mixed powder is ground to a fine powder having particles a few microns in size and then the metallic salt is reduced, in this case by heating in hydrogen at a temperature of about 280° C. This converts the salt into the metallic form, so that metallic particles are included between the lubricant layers. The metallic particles are therefore covered and protected against oxidation in air. The heat treatment also stabilized the overall structure of the prepared material.

The movement of the lubricant layers can be observed under a magnetic field.

The resulting composition maintains the layered form of $MoS_2$, or other layered compositions employed, but results in the inclusion of microscopic size magnetic particles of Fe, Ni or Co between the sliding layers of the solid lubricant. When such a magnetic lubricant is applied to ferromagnetic surfaces, the lubricant is highly dispersed, and the magnetic particles covered with the layers of the lubricant material are held in place firmly over the surface. This prevents or highly reduces the movement of the lubricant particles away from the contact points between the two moving surfaces. Obviously at least one of the surfaces must be ferromagnetic in order to hold the lubricant. The lubricant spreads evenly over the surface of the ferromagnetic material. The sliding surfaces move against each other with a constant coefficient of friction.

The addition of the magnetic particles to the lubricant layers increases the coefficient of friction compared with pure $MoS_2$. Moreover, the coefficient of friction increases as the Fe/Mo ratio increases. The smaller the size of the Fe (or other magnetic metal) clusters, and the lower the Fe content, the closer the friction coefficient comes to that of pure $MoS_2$. Therefore, it is desirable to choose Fe/Mo ratios with the lowest possible value.

The solid lubricant with magnetic inclusion may also be combined with liquid or semi-liquid lubricants such as mineral oils or greases.

EXAMPLES

Figure 1:
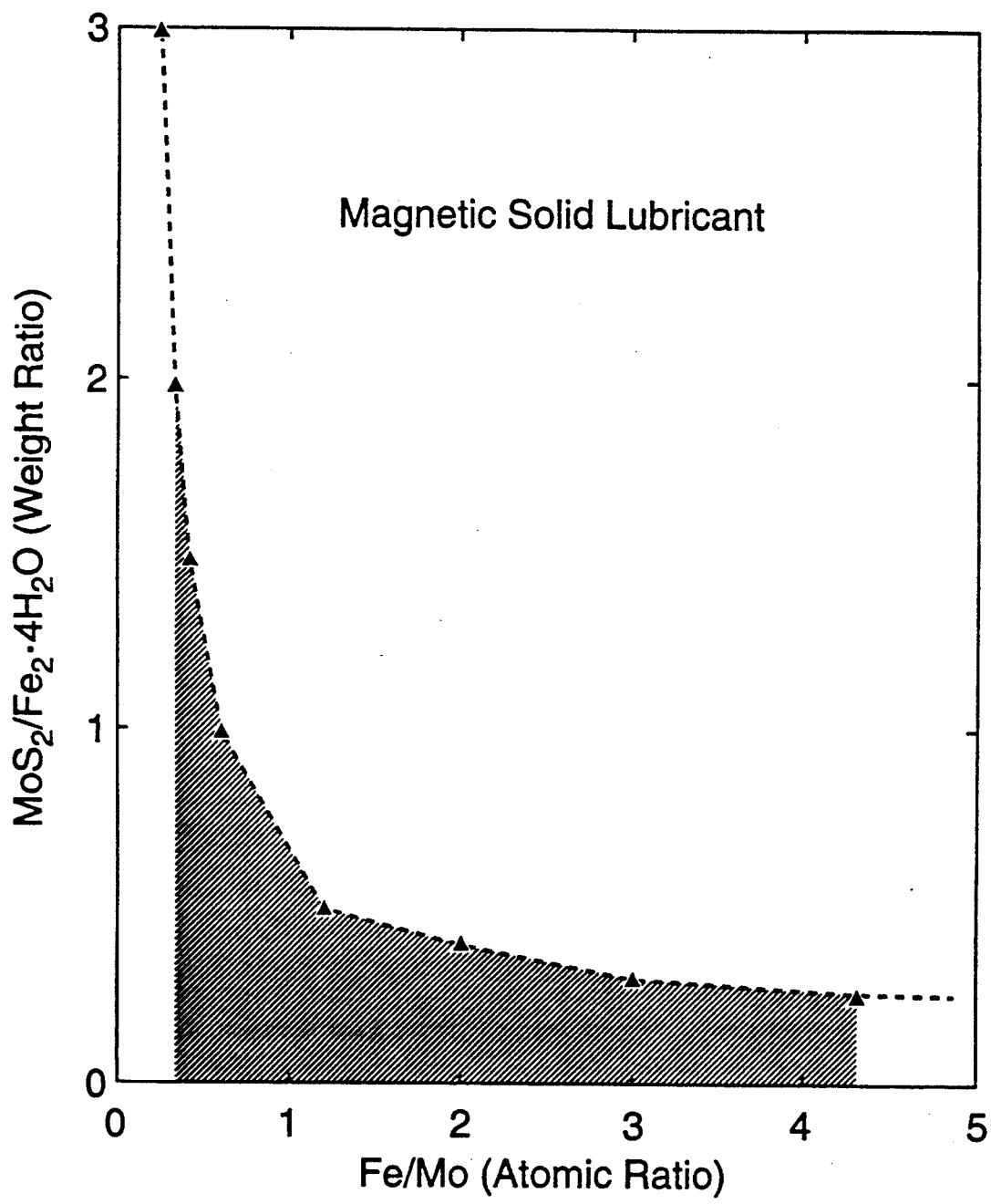
FIG. 1 is a graph showing the plot of $MoS_2$ loading with $FeCl_2$ versus the analyzed Fe/Mo atomic ratios of the mixtures, the shaded area representing the effective Fe/Mo ratios for which the prepared $MoS_2$ covered Fe particles are affected by an applied magnetic field.

Referring to the drawings, 98.5 percent purity $MoS_2$ powder from MRC Inc. was mixed with a 1 molar solution of $FeCl_2.4H_2O$ in different proportions to find the minimum amount of Fe required to be magnetically effective. FIG. 1 shows the plot of $MoS_2$ loading with $FeCl_2$ versus the analyzed Fe/Mo atomic ratios of the mixtures. The shaded area represents the effective Fe/Mo ratios for which the prepared $MoS_2$ covered Fe particles are affected by the magnetic field.

In this example, the Fe/Mo ratio selected was 0.6 for 4 g $MoS_2$/20 ml of 1 molar solution $FeCl_2.4\ H_2O$. The mixture was stirred continuously and heated until the slurry was dried. The dried mixture was then ground into fine particles of a few microns in size. The powder was heat-treated and reduced in hydrogen gas in a furnace at about 285° C. for a minimum of about 5 hours.

Figure 2:
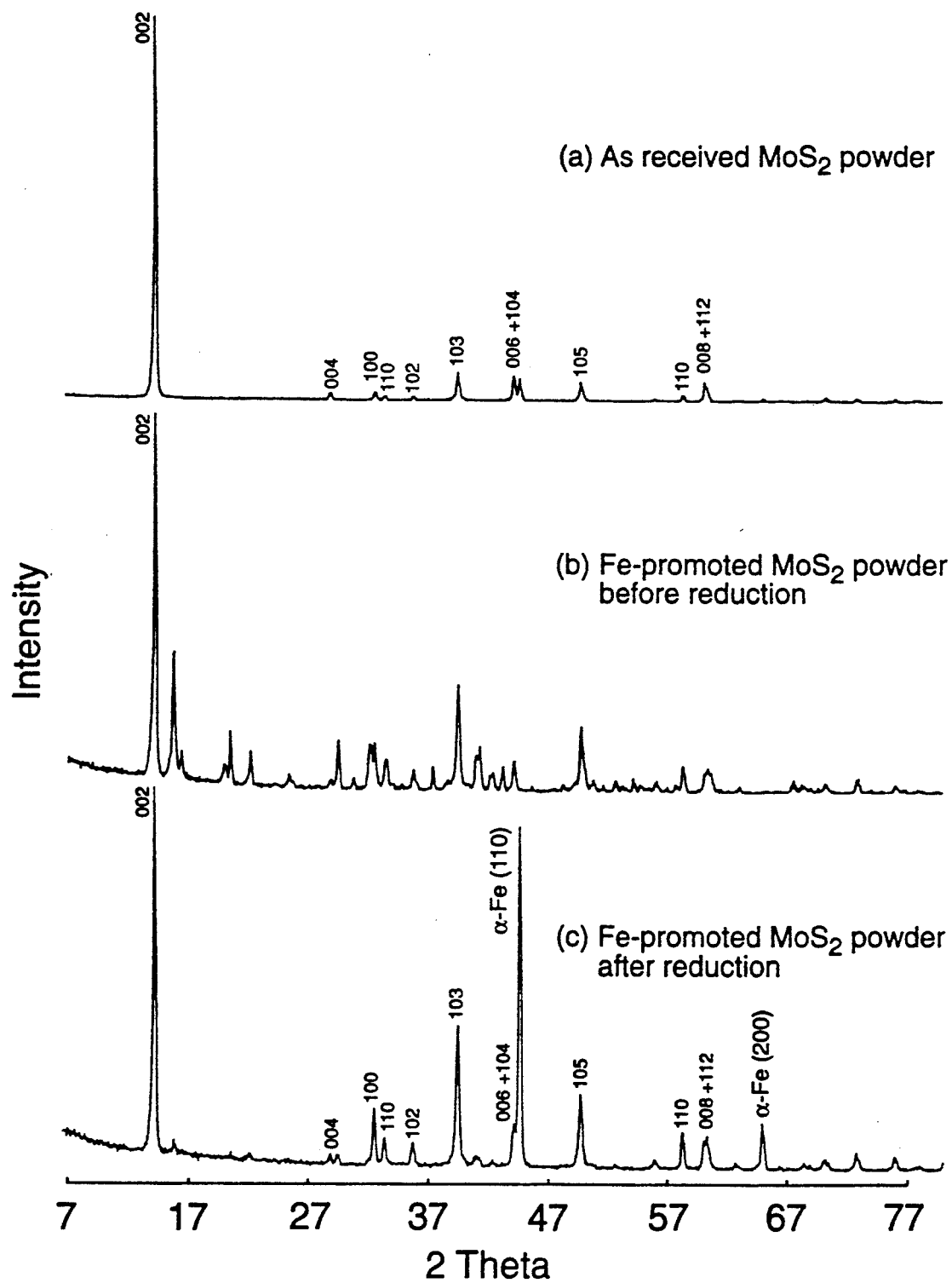
FIGS. 2a, 2b and 2c show the x-ray diffraction patterns representing pure $MoS_2$, the sample mixture before reduction of the magnetic inclusion, and for the mixture after the reduction respectively.

FIGS. 2a, 2b and 2c show the x-ray diffraction patterns for the sample at different stages of preparation. FIG. 2a represents the x-ray diffraction pattern for pure $MoS_2$. FIG. 2b is the x-ray diffraction pattern for the sample mixture before reduction in hydrogen. FIG. 2c shows the pattern for the mixture after reduction of the magnetic metal in the hydrogen. The principal alpha iron lines are clearly visible in this pattern. It is these iron particles that are responsible for the magnetic properties of the lubricant layers.

Figure 3:
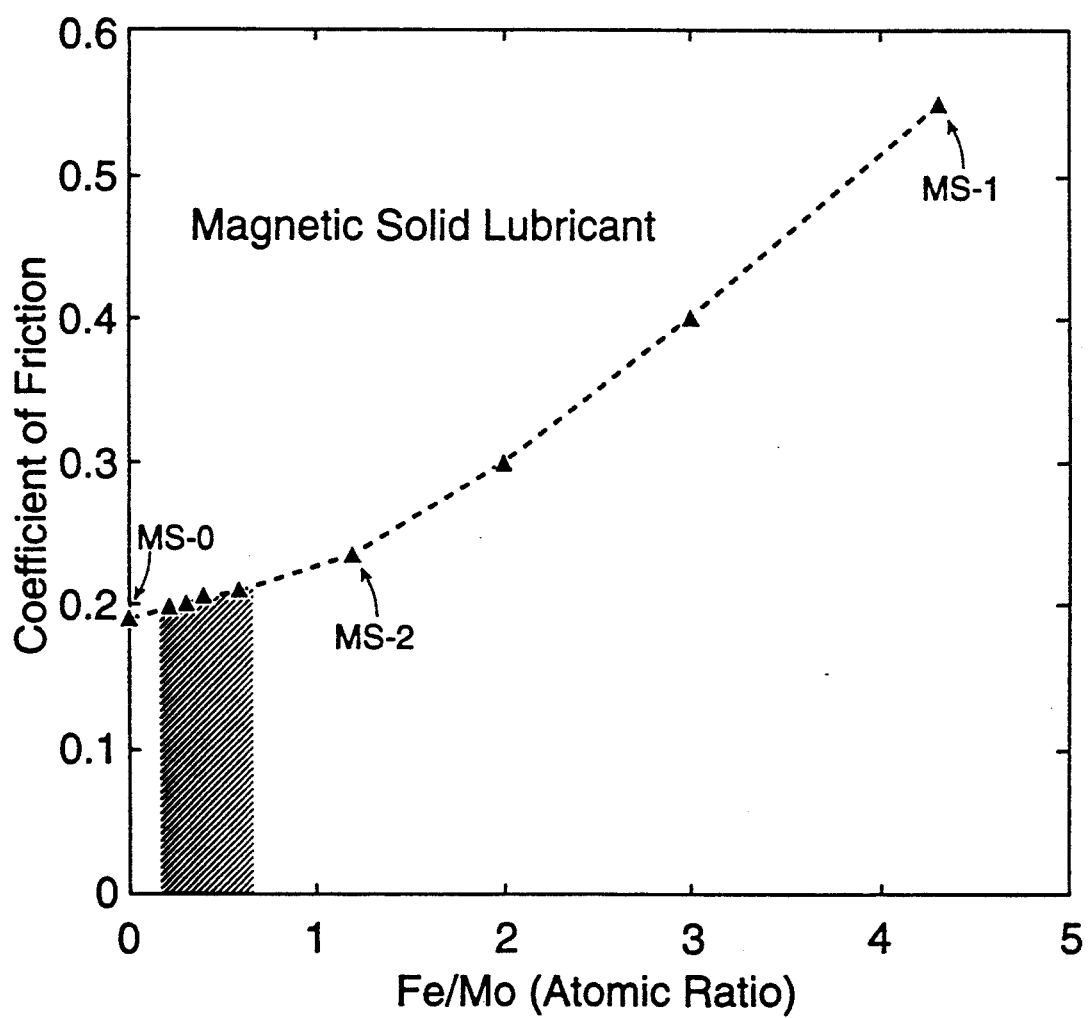
FIG. 3 is a graph showing the results of friction tests on samples wherein the coefficients of friction are plotted against the ratio of Fe/Mo.

FIG. 3 shows the results of friction tests on the samples. The tests were carried out with respect to flat-on-flat reciprocation sliding. It may be seen that the friction coefficient increases as the Fe/Mo ratio becomes greater than 1. The shaded area is the region for which the lubricant layers are magnetic and the friction coefficient is close to that of pure $MoS_2$.

Figure 4A:
FIGS. 4a, 4b and 4c are photographs of three different sliding surfaces wherein the lubricant is pure $MoS_2$, a sample having a Fe/Mo ratio of 4.3 and a Fe/Mo ratio of 1.1 respectively.
Figure 4A:
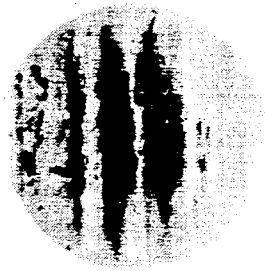
Figure 4B:
Figure 4B:
Figure 4C:
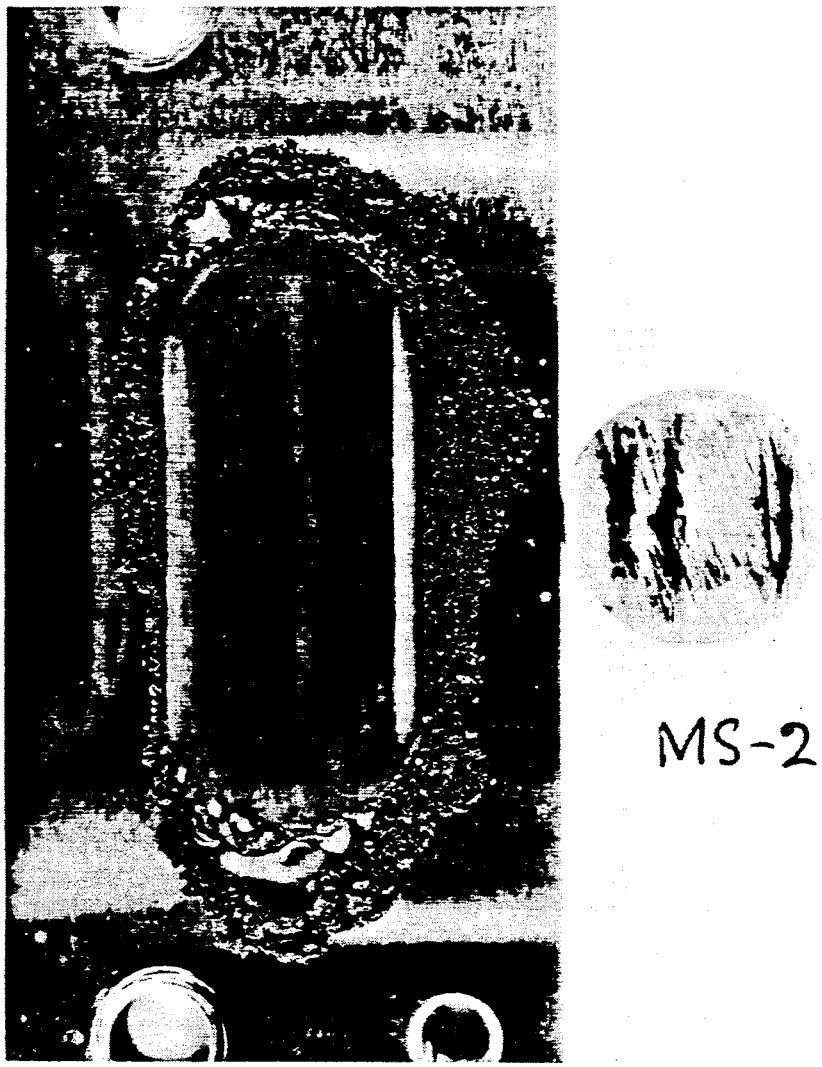

FIGS. 4a, 4b and 4c are photographs of the surfaces of three samples with different lubricants used. FIG. 4a shows the sliding surfaces with the use of pure $MoS_2$ lubricant. FIG. 4b shows the surfaces having $MoS_2$ with the magnetic inclusion and a Fe/Mo ratio of 4.3. Finally, FIG. 4c represents the sliding surfaces where the lubricant has an Fe/Mo ratio of 1.1. It is evident from the photographs that the surfaces in FIG. 4a and 4c are very similar and are quite different from the surface of FIG. 4b where the Fe/Mo ratio is 4 times that of FIG. 4c.

Figure 5:
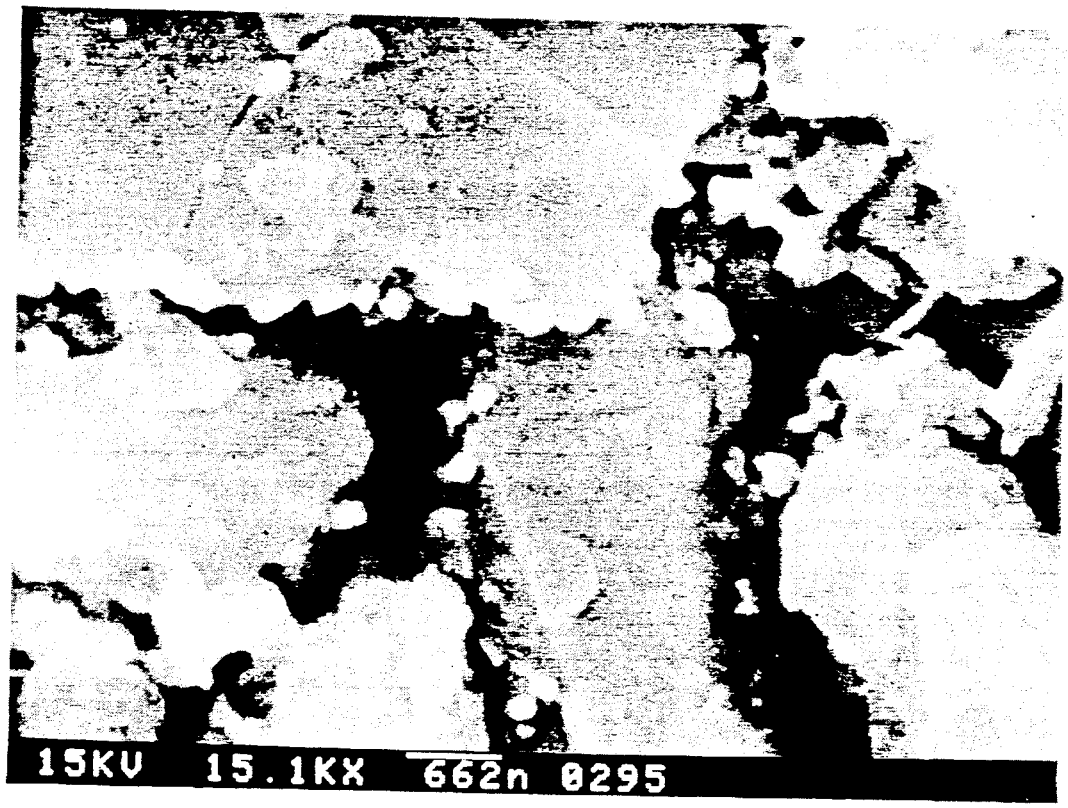
FIG. 5 is a scanning electron micrograph of a sample lubricant showing magnetic particles at the edges of particles thereof.

FIG. 5 is a scanning electron micrograph of the solid lubricant. The Fe or other magnetic metal is near edges of the platelets of the $MoS_2$ or other layered material. This is because the S-Mo bond on the edges of $MoS_2$, or equivalent bonds for the other materials, are broken and form some unsaturated dangling Mo bonds that are susceptible to attract matching d-orbitals such as Fe, Ni or Co particles. The basal planes of $MoS_2$ have strong S-Mo-S bonds (which are responsible for the lubricating characteristics). Thus the basal planes have saturated bonds and are free of magnetic particles, at least theoretically. In the powder form the newly modified layers overlap each other so the edges are protected from oxidation.

It will be understood by someone skilled in the art that many of the details provided above are by way of example only and can be varied or omitted without departing from the scope of the invention which is to be interpreted with reference to the following claims:

What is claimed is:

1. A lubricant having the formula:

$$X:Y$$

wherein X is a layered material with a graphite-like structure having unsaturated bonds at edges of particles thereof and Y is a magnetic inclusion between layers of X, Y having a magnetic field.

2. A lubricant having the formula:

$$X:Y$$

wherein
X is a layered material selected from the group consisting of graphite and transition metal dichalcogenides having the formula $AB_2$, wherein A is selected from the group consisting of Mo, W, Ti and Ta and B is selected from the group consisting of S and Se; and
Y is a magnetic inclusion between layers of X, Y having a magnetic field.

3. A lubricant as claimed in claim 1, wherein the X:Y is in particulate form and the Y is between layers of X near edges of particles of X, each said particle having a magnetic field.

4. A lubricant as claimed in claim 1, wherein Y is selected from the group consisting of Fe, Ni and Co.

5. A lubricant as claimed in claim 1, wherein the ratio of Y/X is between 0.2 and 4.3.

6. A lubricant as claimed in claim 1, wherein the ratio of Y/X is less than 1.0.

7. A lubricant as claimed in claim 1, wherein the ratio of Y/X is between 0.2 and 0.7.

8. A lubricant as claimed in claim 1, wherein X is Mo.

9. A lubricant as claimed in claim 1, wherein the lubricant is in powder form.

10. A process for making a magnetic lubricant having the formula:

$$X:Y$$

wherein X is a layered composition and Y is a magnetic metal inclusion between layers of X, the process comprising the steps of:
 (a) adding X to a solution containing ions of Y;
 (b) mixing the solution and Y to form a mixture;
 (c) drying the mixture; and
 (d) reducing the Y to a metallic form.

11. A process as claimed in claim 10, wherein the solution is an aqueous solution of a salt of Y.

12. A process as claimed in claim 11, wherein the salt is a chloride.

13. A process as claimed in claim 12, wherein the salt is a chloride selected from the group consisting of chlorides of Fe, Ni and Co.

14. A process as claimed in claim 12, wherein X is selected from the group consisting of graphite and transition metal dichalcogenides having the formula $AB_2$, wherein A is Mo, W, Ti or Ta and B is S or Se.

15. A process as claimed in claim 10, wherein the X added to the solution is in powder form.

16. A process as claimed in claim 10, wherein the mixture is dried by heating.

17. A process as claimed in claim 16, wherein the heating is at a temperature of generally 120° C.

18. A process as claimed in claim 17, wherein the mixture is continuously stirred while being dried.

19. A process as claimed in claim 10, wherein the Y is reduced by heating the dried mixture in a reducing gas.

20. A process as claimed in claim 19, wherein the gas is $H_2$.

21. A process as claimed in claim 19, wherein the gas is heated to a temperature generally near 280° C.

22. A process as claimed in claim 21, wherein the dried mixture is exposed to the $H_2$ for a period of generally 5 hours.

23. A process as claimed in claim 10, wherein the dried mixture is ground to a fine powder before the reduction of Y.

24. A bearing having two surfaces in contact with each other and movable with respect to each other, at least one of the surfaces being of a ferromagnetic material, and a lubricant between the surfaces having the formula X:Y, wherein X is a layered material with a graphite-like structure having unsaturated bonds at edges of particles thereof, and Y is a magnetic inclusion between layers of X, Y having a magnetic field so the lubricant adheres to said at least one of the surfaces.

25. A lubricant, comprising:
an oil or grease; and
a powder mixed therewith, having the formula:

X:Y wherein X is a layered material with a graphite-like structure having unsaturated bonds at edges of particles thereof and Y is a magnetic inclusion between layers of X, Y having a magnetic field.

* * * * *